UNITED STATES PATENT OFFICE.

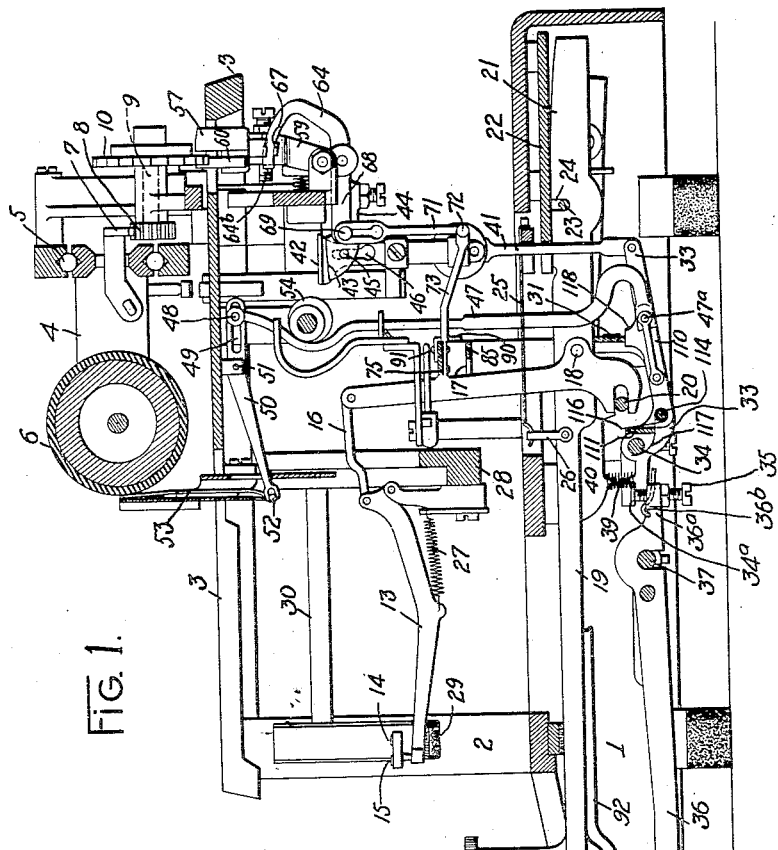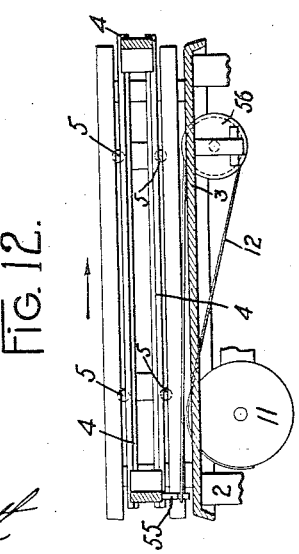

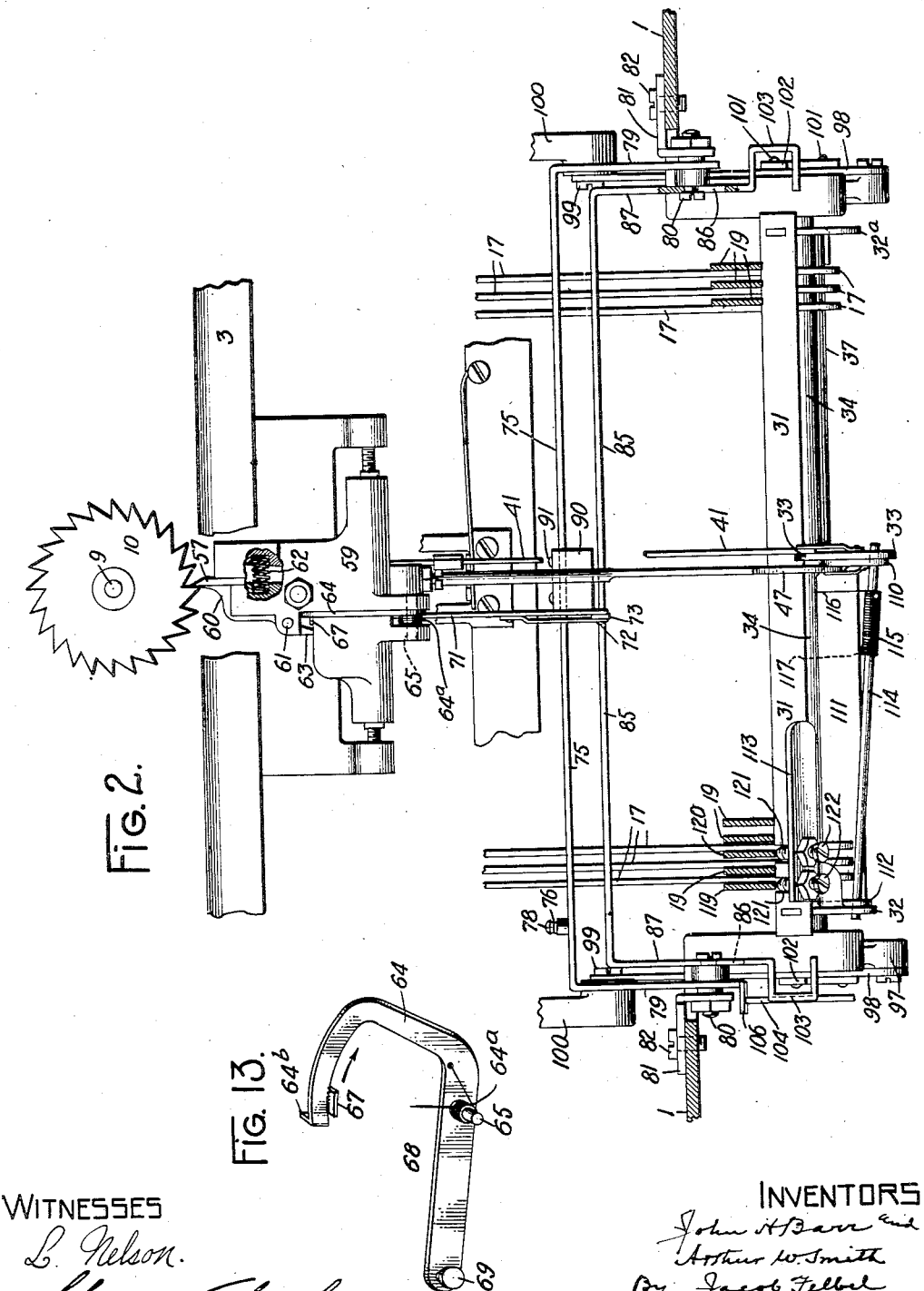

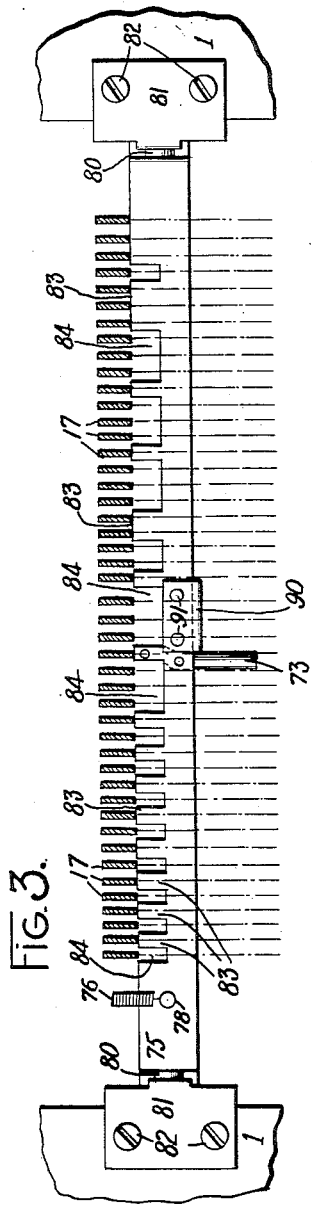
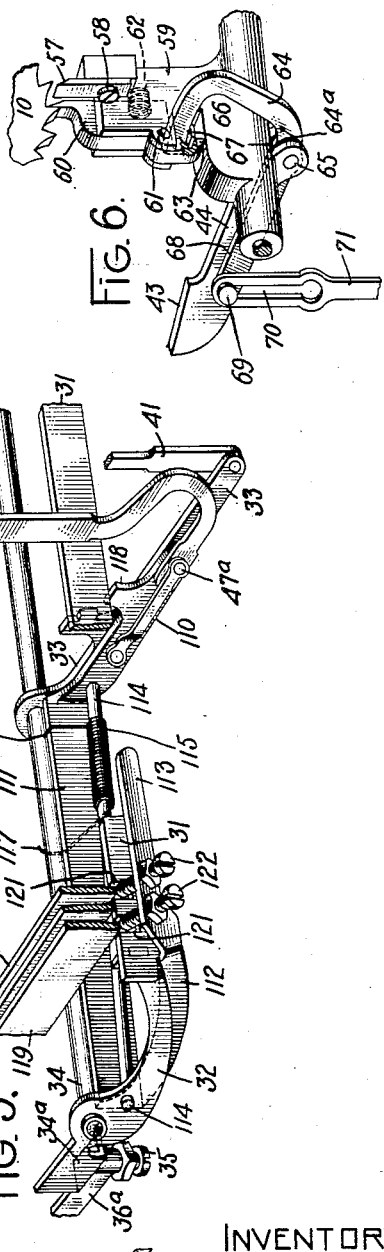
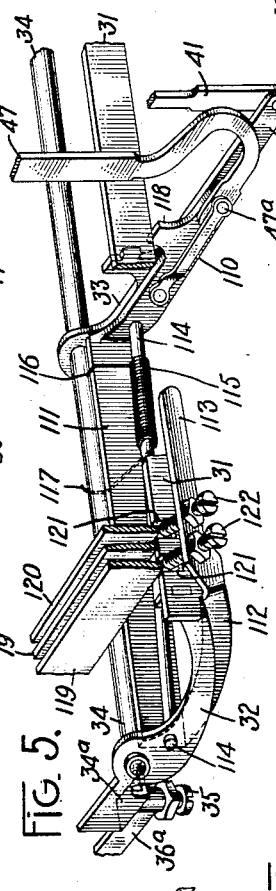

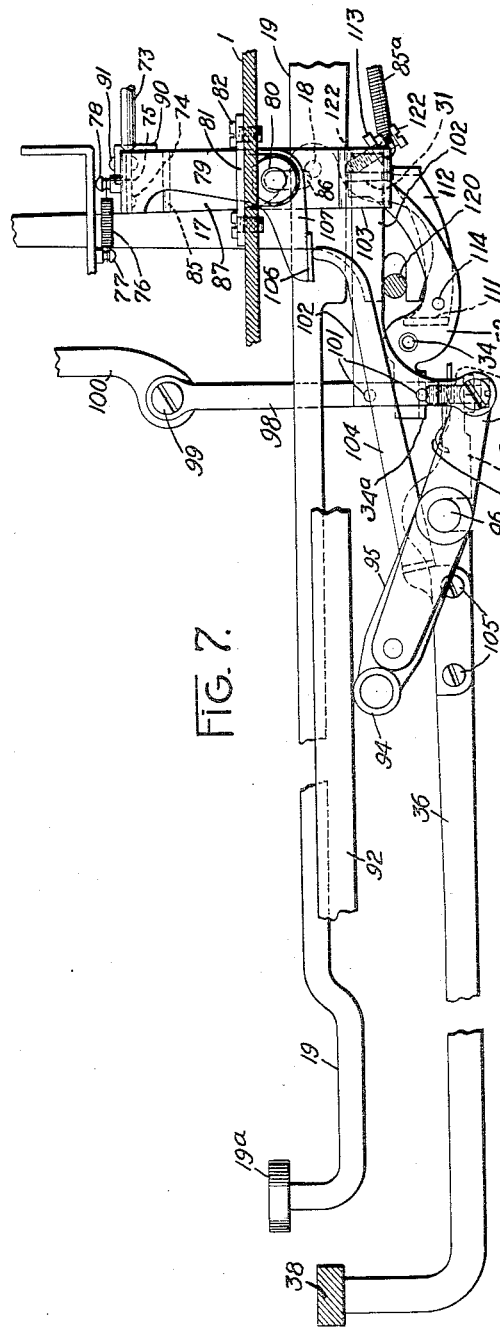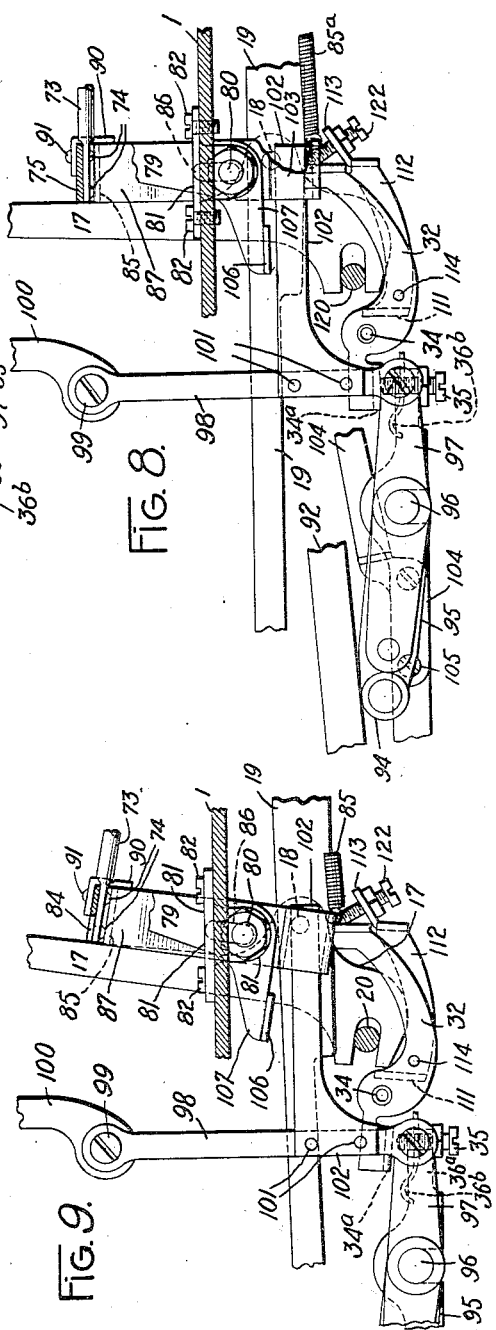

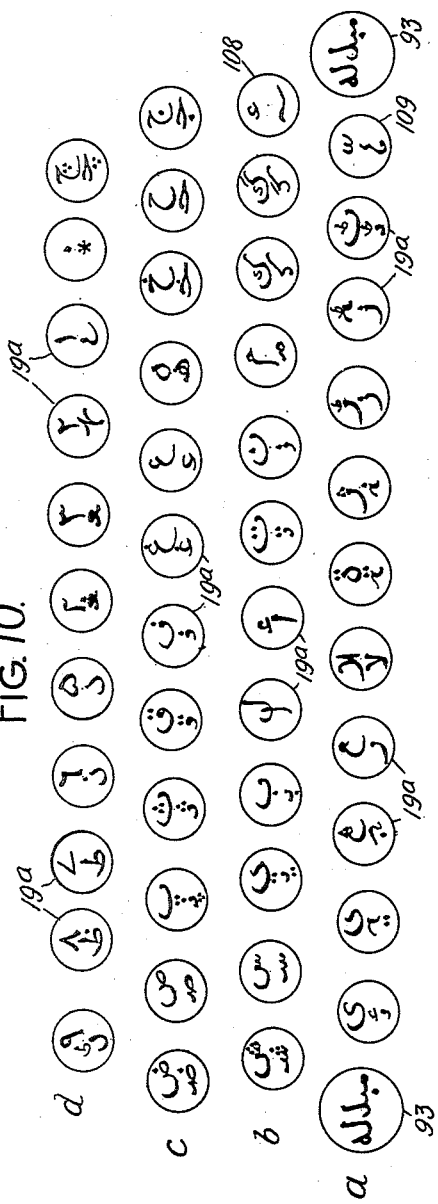

JOHN H. BARR AND ARTHUR W. SMITH, OF NEW YORK, N. Y., ASSIGNORS TO REMINGTON TYPEWRITER COMPANY, OF ILION, NEW YORK, A CORPORATION OF NEW YORK.

TYPE-WRITING MACHINE.

1,250,416.   Specification of Letters Patent.   Patented Dec. 18, 1917.

Application filed August 4, 1917. Serial No. 184,521.

*To all whom it may concern:*

Be it known that we, JOHN H. BARR and ARTHUR W. SMITH, citizens of the United States, and residents of the borough of Manhattan, city of New York, in the county of New York and State of New York, have invented certain new and useful Improvements in Type-Writing Machines, of which the following is a specification.

Our invention relates to typewriting machines and more particularly to machines for writing foreign languages. The machine is designed primarily for writing languages based on the Arabic characters, such, for example, as Turkish, Persian, Urdu, Malayan and many others in addition to Arabic itself.

One of the main objects of the invention, generally stated, is to provide an efficient and comparatively simple machine of the character specified.

A further object of our invention is to readily adapt an ordinary typewriting machine employed for writing English or other European languages to use as a so-called Arabic machine of the character specified above without modifying, or materially modifying, the structural features of such ordinary machines as they now exist.

To the above and other ends which will hereinafter appear our invention consists of the features of construction, arrangements of parts, and combinations of devices set forth in the following description and particularly pointed out in the appended claims.

In the accompanying drawings, wherein like reference characters represent corresponding parts in the various views, Figure 1 is a fore and aft vertical central sectional view of one form of typewriting machine embodying our invention, only so much of the machine being shown as may be necessary to illustrate our invention in its embodiment therein.

Fig. 2 is a fragmentary detail rear elevation with parts in section of the variable escapement mechanism and some of the associate parts.

Fig. 3 is a detail plan view of one of the auxiliary universal bars, the co-acting sub-levers being shown in section.

Fig. 4 is a corresponding view of the other, or shiftable, auxiliary universal bar.

Fig. 5 is a detail fragmentary perspective view of the so-called dead key mechanism and some of the associate parts.

Fig. 6 is a detail fragmentary perspective view of the escapement devices with parts broken away.

Fig. 7 is a detail fragmentary side elevation of the case shifting mechanism and parts of the escapement controlling mechanism associated therewith.

Fig. 8 is a like view of the same showing the parts as they appear when a case shift key is depressed.

Fig. 9 corresponds substantially to Fig. 8 except that in Fig. 9 the parts are shown as they appear when a key lever that controls the lower auxiliary universal bar is depressed.

Fig. 10 is a diagrammatic view of the keyboard as it actually appears in the machine.

Fig. 11 is a diagrammatic view of the keyboard with indices to indicate how each key controls the escapement for both lower and upper case writing.

Fig. 12 is a detail front elevation with parts in section showing on a small scale the carriage and the manner of connecting the carriage with the spring drum.

Fig. 13 is a detail perspective view of the controlling device.

In all of the figures except Figs. 1, 11 and 12, the parts are shown full-size.

In the present instance we have shown the invention embodied in a Monarch machine in which the invention may be readily incorporated without modifying, or materially modifying, the structural features of that machine except, in the main, by including therein devices which are in the nature of attachments. It should be understood, however, that the invention may be embodied in various styles of typewriting machines and that various changes may be made in order to effect such embodiment.

By the present invention we provide comparatively simple means by which the inventive idea disclosed in the patent to Selim S. Haddad, No. 637,109 may be effectively carried out in a typewriting machine, and we provide for automatically variably letter spacing, or eliminating the spacing, as may be required by the particular characters written on the machine.

The invention from certain aspects is in the nature of an improvement on the construction disclosed in the patent to Herbert H. Steele, No. 1,044,285, dated November 12, 1912.

The frame of the machine comprises a base 1, corner posts 2 and a top plate 3. A carriage, designated as a whole by the reference numeral 4, is mounted on bearing rollers or balls 5 to travel over the top plate from side to side of the machine, the carriage carrying a cylindrical platen 6. A feed rack 7, carried by the carriage, meshes with a feed pinion 8. This pinion is fixed to a shaft 9 which is operatively connected by pawl and ratchet connections (not shown) with an escapement wheel 10. Suitable feed dogs, to be hereinafter described, resist the movement of the escapement wheel under the power applied to the carriage from a spring drum 11, through a band or strap 12.

The printing instrumentalities in the present instance comprise a system of segmentally arranged upwardly and rearwardly striking type bars 13; the type blocks on each bar having a so-called upper case type 14 and a so-called lower case type 15. Each type bar is connected by a link 16 to a sub-lever 17, pivoted at 18 to a key lever 19 which terminates at its forward end in a printing key 19ª. Each sub-lever is fulcrumed on a fulcrum rod 20 secured at its ends to the base of the machine. Each key lever bears at its upper rear edge 21 against a fulcrum plate 22, the key levers being fixed against longitudinal displacement by a rod 23 received in cut-outs 24 in the key levers. A returning spring 25 is connected to each key lever through a strap 26, whereas, each type bar is returned to normal position by a returning spring 27. Various type bars are mounted on a type bar segment 28 and are supported at their free ends by type rests 29 supported by rods 30 which project forward from the type bar segment. In the present instance a relative shifting movement between the system of type bars and the platen 6 is effected by shifting the type bar segment vertically from its normal position to bring the upper case characters into use. The case shift mechanism will be hereinafter described.

A universal bar 31, which we term a primary universal bar, extends beneath the various key levers and is supported by arms 32, 32ª and 33 which project rearwardly from a rock shaft 34 to which they are secured. The side arms 32, 32ª extend forwardly beyond the rock shaft 34, where they have laterally extending contact portions 34ª which co-act or contact with set screws 35. These screws are carried by the rear ends 36ª of levers 36, fulcrumed at 37 and united to form a frame which carries a space key 38 at the forward end thereof. Springs 36ᵇ return this frame to normal position. The centrally disposed arm 33 likewise extends forward of the rock shaft 34 and co-acts with an expansion spring 39 which bears at its upper end against a fixed portion 40 of the frame of the machine. The centrally disposed arm 33 projects rearwardly beyond the universal bar and is connected to an upright two-part link, designated as a whole by the reference numeral 41, which carries a laterally projecting shelf-like actuating member 42 at the upper end thereof. This actuating member projects laterally from the link and overlies a curved contact face or tread 43 on the forward arm 44 of a dog rocker or carrier. This arm is also provided with a laterally projecting pin 45 which is received in a slot 46 in the link. A rolling contact is thus provided between the member 42 on the link and the contact portion 43 on the arm of the dog rocker. It will be understood that a depression of a key lever is effective to move the corresponding type bar to the printing position and to depress the universal bar 31, thereby actuating the dog rocker to effect a feed of the carriage. The space key may also be operated to actuate the dog rocker by moving the universal bar frame through the contact screws 35. An upright link 47 is operatively connected at its lower end to the universal bar frame, and is provided at its upper end with a laterally projecting pin 48 received in a slot 49 in a ribbon vibrator lever 50, the latter being pivoted at 51 to a lug secured to the top plate of the machine. The forward end of this actuating lever is connected at 52 to a ribbon vibrator 53. Each operation of the universal bar 31 is effective to move the ribbon vibrator upwardly to interpose the ribbon between the approaching type and the paper on the platen. The purpose of the pin and slot connection 48 and 49, between the ribbon vibrator actuating-link 47 and lever 50 is to effect a crosswise feed of the ribbon with the aid of the usual eccentric 54 and other means associated with the actuating link, which need not be described.

The parts as thus far described constitute a part of the usual equipment of the Monarch machine.

In the present instance, however, the carriage instead of receiving a letter-space movement from right to left under control of its escapement mechanism receives a letter space movement from left to right. Thus, the band 12 is connected to the carriage at 55, and in passing from this point of connection to the spring drum extends over a pulley 56 mounted in suitable bearings carried by the top plate of the machine, as indicated in Fig. 12. In this manner the force of the spring is exerted to move the carriage from left to right, or in the direction of the arrow in Fig. 12, and the escapement mechanism is constructed to operate accordingly.

From an inspection of Fig. 6 it will be seen that the variable escapement devices comprise a fixed dog 57, secured at 58 to the dog rocker or carrier 59, and a loose dog 60. The dog 60 is pivoted at 61 to the dog rocker to vibrate in the plane of the escapement wheel, or in a plane parallel therewith, from the position represented in Fig. 6 to the left, or to the right as the parts are viewed from the front of the machine when the dog rocker is moved to release the loose dog from the escapement wheel. This movement of the loose dog when released from the escapement wheel is effected by a spring 62. The loose dog extends downwardly beyond its pivot to form an engaging portion or stop 63. This stop co-acts with a companion stop to limit the movement of the loose dog to its advanced position, when it is released from the escapement wheel. It will be understood that by varying the extent of movement that the loose dog may receive under the action of its spring 62, a corresponding variation in the extent of feed of the carriage is produced. Thus, if the loose dog receives a movement corresponding to the distance between two adjacent teeth of the escapement wheel this will effect a single space movement of the carriage, whereas, if the loose dog receives a movement corresponding to the distance between three adjacent teeth of the escapement wheel a double space movement of the carriage is effected. In the present instance we have provided controlling means for determining the extent of movement that the loose dog may receive around its pivot 61. Thus, an angular lever or controlling device 64 is pivoted at 65 to the dog rocker, and projects at its upper forwardly extending end through a cut-out 66 in the dog rocker. This device 64 is shown in detail in Fig. 13 from which it will be understood that a spring 64ª surrounds the pivot 65 and is connected at one end to the dog rocker and at its opposite end to the member 64. The power of this spring is exerted to turn the device on its pivot 65 in the direction of the arrow in Fig. 13. The device is limited in its movement in this direction relatively to the dog rocker by a stop 64ᵇ which is bent laterally from the upper end thereof and co-acts with the body of the dog rocker. The member 64 is thus returned to and retained in its normal position relatively to the dog rocker by the spring 64ª, and is adapted to oscillate with the dog rocker. A stop 67 is off-set from the body of the member 64 so as to normally project in the path of the depending arm or stop 63 of the loose dog when the parts are positioned as represented in Fig. 6. This limits the movement of the loose dog to a single space movement and the carriage is fed accordingly. When, however, the angular lever 64 is moved relatively to the dog rocker by being turned on its pivot 65 from the normal position, it displaces the stop 67 from the path of the stop 63 on the loose dog and the latter is then adapted to receive a further movement to afford a double space feed. At this time the stop 63 on the loose dog co-acts with the body portion of the lever 64 to arrest the movement of the dog under the action of the spring 62. The control of the regulating device or angular lever 64 is automatically effected to determine the extent of feed which may be given the carriage by the following means. The forwardly extending arm 68 of the angular lever 64 is provided with a laterally projecting headed pin 69 which is received in a slot 70 of an upright link 71. This link is pivoted at its lower end, at 72, to an arm 73 rigidly connected, at 74, to an auxiliary universal bar 75. This universal bar is returned to and maintained in its normal position by a contractile spring 76 connected at one end to a pin 77 secured to a fixed portion of the machine, and at its opposite end to a pin 78 which projects upwardly from the universal bar. This universal bar is provided at its ends with depending arms 79 pivoted at their lower ends, at 80, to brackets 81 secured to the base of the machine by screws 82. From an inspection of Fig. 3 is will be observed that the forward edge of the universal bar 75 is provided with engaging projections 83 opposite certain of the sub-levers 17, whereas, the forward edge of the universal bar is cut out or recessed at 84 opposite certain other of the sub-levers. The effect of this construction is to provide for actuating the universal bar 75 from certain only of the sub-levers, or from those which are adapted to co-act with the engaging projections 83. Should the operator depress a printing key which has its corresponding sub-lever 17 opposite a cut-out or recess 84, then the escapement mechanism will be actuated solely by the operation of the primary universal bar 31, and a single space movement of the carriage will be effected. If on the other hand the operator depresses a printing key which has its sub-lever 17 opposite an engaging projection 83 on the auxiliary universal bar 75, then said universal bar will be actuated in advance of the dog rocker to move the stop 67 out of the path of the loose dog. The primary universal bar 31 will also be actuated to move the dog rocker, so as to release the loose dog and cause the escapement wheel to be engaged by the fixed dog 57. The loose dog will then advance a double letter space distance and when it is reëngaged, on the return movement of the finger key and dog rocker, a double letter space movement of the carriage will be effected.

It will be seen that by the construction thus for described either a minimum or maximum extent of feed of either one or two letter spaces is provided, depending on whether or not the auxiliary universal bar 75 is actuated, and this latter depends on whether the sub-lever of the actuated key is opposite an engaging projection or a depression of the auxiliary universal bar 75.

It is desirable in some cases to provide a minimum space when writing a lower case character, and to provide the maximum spacing when writing an upper case character on the same type bar. This result may be effected by the following means. A second auxiliary universal bar 85 is arranged beneath the auxiliary universal bar 75 and is mounted to turn on the same pivots 80 on which the universal bar 75 turns a spring 85ᵃ returning the bar 85 to normal position. The bearing openings 86 in the depending arms 87 of the auxiliary universal bar 85 are in the nature of slots, which afford a bodily shifting movement of the bar 85 as well as a pivotal movement thereof around the pins 80. As will be seen from an inspection of Fig. 4, the auxiliary universal bar 85 is also provided with engaging projections 88 opposite certain only of the sub-levers 17, and has cut-outs or recesses 89 opposite certain of the other sub-levers 17. From a comparison of Figs. 3 and 4 it will be seen that the sub-levers operative on one auxiliary universal bar 75 or 85 do not act on the other auxiliary universal bar, and that in some instances certain sub-levers act on neither of these auxiliary universal bars. There is no direct connection between the auxiliary universal bar 85 and the escapement mechanism or the controlling device 64; the only connection to these parts from the bar 85 being effected through the auxiliary universal bar 75. Thus, it will be seen that a depending finger, lug or arm 90 is fixedly secured to the universal bar 75, as at 91, and that when the universal bar 85 receives a bodily shifting movement from the position represented in Fig. 7, to that shown in Fig. 8, said universal bar 85 will lie in front of the arm 90. A rearward movement transmitted to the universal bar 85 at this time is effective to transmit a corresponding movement to the universal bar 75, and from it to the controlling member 64, to afford a double space movement of the carriage. It follows therefore that when the auxiliary universal bar 85 is in the shifted position, shown in Fig. 8, motion transmitted from a sub-lever 17 to either of the auxiliary universal bars 75 or 85 is effective to actuate the controlling device 64 and afford a double space movement of the carriage. When, however, the auxiliary universal bar 85 is in the non-shifted, or lowermost, position it is freed from the finger 90, and an actuation of said bar at this time merely results in an idle movement thereof without transmitting movement to the member 64, or without in any manner affecting the escapement mechanism. In the position of the parts represented in Fig. 7 either of the universal bars 75 or 85 may be moved independently of the other. In the position of the parts represented in Fig. 8 the universal bar 75 may be operated independently of the universal bar 85, but the latter at this time cannot be actuated independently of the universal bar 75, since there is an operative connection therewith through the depending finger 90.

The bodily movement of the auxiliary universal bar 85 is automatically controlled in the present instance by the case shift mechanism. Thus, case shift levers 92 provided with case shift keys 93 are fulcrumed in the base of the machine and co-act with rollers 94 carried by arms 95 which project forwardly from a rock shaft 96. Rearwardly projecting arms 97 from this rock shaft are connected to upright links 98, which in turn are pivoted at their upper ends, as at 99, to depending arms 100 on the type bar segment. The latter, as hereinbefore explained, is mounted in the usual manner for case shifting movement, the usual counter-balancing spring (not shown) being employed to relieve the weight of the parts. This construction is or may be that usually provided in the Monarch machine. Extending rearwardly from and fixed to the links 98, at 101, are two arms 102 arranged at opposite sides of the machine. The rear end of each arm 102 extends through a yoke-like portion 103 formed at the lower end of one of the depending arms 87 of the universal bar 85. Each yoke therefore forms a connecting means with which the associate arm 102 co-acts to effect a shift movement of the auxiliary universal bar 85 from the position shown in Fig. 7, to that indicated in Fig. 8, when a case shift key is depressed. When the depressed case shift key is released the segment returns to its normal or lower case position, and the universal bar 85 receives a corresponding movement from the position shown in Fig. 8, to that represented in Fig. 7, thus automatically releasing the escapement mechanism from the control of the universal bar 85.

From an inspection of Figs. 3 and 4 it will be seen that the fifth sub-lever from the left-hand end of the series co-acts with a projection 88 on the auxiliary universal bar 85, and that this same sub-lever is arranged opposite an opening or recess 84 in the universal bar 75. It follows that if the printing key controlling this sub-lever be actuated when writing a lower case character, only a single letter space movement of the carriage will be effected by reason of the fact that the universal bar 85 at this time is ineffective to control the escapement mechanism. When, however, a case shift key is depressed to bring the parts in the positions represented in Fig. 8, an actuation of the printing key controlling this same sub-lever will, at this time, move the universal bar 85 and through its engagement with the finger 90 will move the auxiliary universal bar 75, thus operating the controlling member 64 and effecting a double space movement of the carriage. It will be seen, therefore, that the same printing key which is effective to afford only a single space movement of the carriage when writing lower case, is effective to produce a double space movement of the carriage when writing upper case. The movement of the auxiliary universal bar 75 by the universal bar 85 under the action of a sub-lever is shown in Fig. 9.

From an inspection of Fig. 7 it will be seen that one of the space key levers 36 has a rearwardly and upwardly extending arm 104, which is secured to said lever by screws 105. The upper end of this arm 104 extends beneath a lateral projection or flange 106 on a forwardly projecting arm 107 of one of the depending arms 79 of the auxiliary universal bar 75. It follows therefore that each actuation of the space key is effective not only to actuate the dog rocker in the manner hereinbefore explained, but is effective also to actuate the auxiliary universal bar 75 and the controlling member 64 connected therewith, in order to effect a double space movement of the carriage; it being desirable in Arabic machines always to effect a double space movement of the carriage with the space key.

It is desirable when writing certain characters to effect an imprint thereof without effecting a letter space movement of the carriage, so that one of such characters may first be written without producing a movement of the carriage and another character may then be written in conjunction therewith. In the present instance we have provided means whereby certain of the printing keys, designated at 108 and 109 in Figs. 10 and 11, may be actuated without moving the carriage. The means in question are illustrated in Figs. 2, 5 and 8 from which it will be seen that the link 47 which controls the ribbon vibrator is pivoted at 47ᵃ to an arm 110 that is formed as a part of a yoke-like member comprising said arm 110, a cross-bar 111, an arm 112, and a short universal bar 113. This yoke-like member is pivoted between the arm 32 and the centrally disposed arm 33. The pivoting of the yoke-like member to the arms in question is effected by a rock shaft 114 which extends loosely through bearing openings in the arms 32 and 33 and is fixedly connected to the arms 110 and 112 of the yoke-like member. A coiled spring 115 surrounds the shaft 114 and bears at one end, as at 116, against the cross bar 111. The other end of the spring extends beneath the cross bar 111 and bears, as at 117, against the rock shaft 34. The spring 115, therefore, is effective to turn the yoke-like member to the position shown in Fig. 5 relatively to the universal bar 31, and the arms 32 and 33 connected therewith. This return movement of the yoke-like member is limited by the coöperation of the arm 112 with the universal bar 31, as shown in Fig. 5. An upwardly extending lug 118 projects from the arm 110 for coöperation with the universal bar 31, so that as the latter is depressed through an operation of any of the printing keys the yoke-like frame and universal bar 31 will move together and the link 47 will be operated to actuate the ribbon vibrator. The special dead keys 108 and 109 are connected to key levers 119 and 120 respectively and the universal bar 31 is cut out at 121 opposite each of said key levers. It is apparent therefore that an actuation of either of the dead key levers may be effected without operating the universal bar 31, and without therefore operating the escapement. It is essential, however, that the ribbon vibrator be operated by the dead keys. Therefor, a set screw 122 is located beneath each of the levers 119, 120 for coöperation therewith. These screws are received in tapped openings in the short universal bar 113 so that means are provided for establishing an operative connection between each of the dead key levers 119, 120 and the yoke-like member comprising the arms 110, 112 and the cross bar 111, to provide for turning said yoke-like member on pivotal axis of its shaft 114, thus actuating the link 47 and the ribbon vibrator independently of the universal bar 31. When pressure is released on a dead key the spring 115 returns the pivoted frame, connected to the link 47, to its normal position relatively to the universal bar 31. It will be understood that in the ordinary actuation of the universal bar 31 from all of the key levers except the dead key levers 119, 120 the universal bar 31 and the frame to which the link 47 is connected will move in unison, thereby actuating the dog rocker and the ribbon vibrator.

Fig. 11 is a diagrammatic view which represents the keyboard of the machine employed in the present instance, and indicates the requirements as to spacing the carriage under control of each key, whether the key be employed to write a so-called upper case character or a lower case character. This diagram also indicates just which keys provide for maximum spacing in both upper and lower case writing; which keys provide for minimum spacing in both upper and lower case; which keys provide for maximum spacing when writing upper case and for minimum spacing when writing lower case, and which keys enable characters to be written without effecting a letter feed movement of the carriage. Thus, the double row of squares represented at *a* indicates the first or foremost row of printing keys; *b* represents the second row of keys; *c* the third row of keys; and *d* the fourth or last row of keys. The upper square of each key represents the upper case position and the lower square the lower case. A character appearing in an upper square of any row would ordinarily indicate the upper case character for that particular key, whereas, a character appearing in the lower square of the same key would indicate the lower case character for that same key. Instead of using the characters actually employed on the keys we have included in the squares of this diagram the letters W, N or D to signify respectively wide spacing, narrow spacing and dead key. Thus, a key of the diagram bearing the letter W in the upper and lower squares thereof indicates that wide spacing is provided when actuating such keys for either upper or lower case writing. A key of the diagram bearing the letter N in both upper and lower squares indicate that such key provides narrow spacing whether writing upper or lower case. A key in the diagram bearing the letter W in the upper square and the letter N in the lower square indicates that wide spacing will be effected when said key is employed for writing upper case and that narrow spacing will be effected when said key is employed for writing lower case. Each of these last mentioned keys is also inscribed with a letter S which indicates that the case shift is effective to control the shift from narrow to wide space or vice versa, accordingly as each of such keys is employed to write an upper or lower case character. The letter D signifies "dead key" and each key bearing this letter is effective to write either an upper or lower case character without effecting a letter space movement of the carriage. From a consideration of this diagrammatic view of the keyboard in the light of the foregoing explanation and from a consideration of the diagram of the keyboard shown in Fig. 10 it will be clearly understood, it is believed, just how each key controls the variable escapement mechanism to provide the requisite space or dead key work whether writing an upper or lower case character.

From the foregoing description it will be understood that the variable escapement mechanism of our invention meets the different requirements of a foreign writing machine of the character referred to, by providing for automatically spacing the carriage the maximum extent when certain only of the lower case characters are written; for spacing the minimum extent when certain only of the upper case characters are written; for spacing the maximum extent when writing either upper or lower case characters from types on the same type block, as applied to certain only of the type actions; for spacing the minimum extent when writing either upper or lower case characters from type on the same type block, as applied to certain only of the type actions; for spacing the minimum extent when writing a lower case character on certain only of the type actions and switching automatically to the maximum spacing when writing an upper case character from a type on the same type block; for effecting a printing of certain only of the characters without effecting a letter space movement of the carriage, and that each of the results stated may be effected by certain only of the keys without effecting the operativeness of the remaining keys to produce the respective results allotted to them.

It will be understood, moreover, that while we have described with considerable detail the embodiment of our invention in a machine intended, in the present instance, for writing the Urdu language the invention is equally adapted for machines for writing various foreign languages, especially those using the Arabic characters, such, for example, as Turkish, Persian, Malayan and Arabic.

Furthermore, it should be understood that the invention readily lends itself for adaptation to machines for writing these various languages, and that only a slight modification of the machine as shown and described is necessary for its adaptation to another language or modification in the use of the characters employed. Thus, aside from changing the type, or some of the type, on the type bars, it is merely necessary to cut or form the two auxiliary universal bars so as to provide for spacing the carriage according to the requirements of the different types employed, whether individual types requiring the maximum or minimum spacing of the carriage are in upper or lower case or both.

While we have described our invention in detail in connection with a foreign language machine it should be understood that it may be employed wherever the features thereof may be found available and is not limited to its use in such a machine, and that certain features of the invention may be employed without others.

The terms "upper case" and "lower case" as used herein are intended more particularly to bring out the distinction in the printing relation between the types and platen as determined by the so-called case shift mechanism, and not to any distinction between the characters themselves, such as that between capital and small letters, it being understood that in the Urdu language there is no distinction between capital and small letters such as there is in the English language.

What we claim as new and desire to secure by Letters Patent, is:—

1. In a typewriting machine, the combination of key operated printing instrumentalities; a platen; means for effecting a relative case shifting movement between the printing instrumentalities and platen; variable letter spacing means controlled by said printing keys and operating automatically to effect relatively wide and narrow spacing when the parts are writing lower case depending on the character written or the key which is actuated; and means controlled by the case shifting means for modifying the action of the letter spacing means to effect relatively wide spacing under control of certain only of said printing keys in writing upper case characters and without affecting the control of the letter spacing means by those keys which afford wide spacing in the lower case position of the parts.

2. In a typewriting machine, the combination of key operated printing instrumentalities including upper case types some of which require two units of widthwise space and some of which only require one unit of widthwise space and also including lower case types some of which require two units of widthwise space and others of which require only one unit of widthwise space, some upper and lower case types on the same type block requiring two units of space and some upper and lower case types on the same type block requiring only one unit of space, case shift mechanism for bringing either upper or lower case type into use, and variable letter space mechanism which automatically affords the requisite spacing under control of the printing keys whether writing upper or lower case, said letter space mechanism being regulated in part by said case shift mechanism.

3. In a typewriting machine, the combination of key operated printing instrumentalities including upper and lower case types, certain of the lower case types requiring as much widthwise space as the maximum widthwise space occupied by an upper case type, and certain of the upper case types requiring the minimum widthwise space, case shift mechanism for bringing either upper or lower case type into use, and variable letter spacing means which automatically affords the requisite spacing under control of the printing keys whether writing upper or lower case, said variable letter spacing means including means controlled by the case shift mechanism for affording the maximum spacing when certain only of the upper case types are used and without affecting the operation of the letter spacing means to provide a minimum space required for certain of the upper case types or the maximum spacing afforded by the actuation of those keys that are accorded such spacing in lower lower case writing.

4. In a typewriting machine, the combination of key controlled printing instrumentalities; a carriage; and variable escapement mechanism therefor comprising two universal bars each controlled by certain only of the printing keys and operable independently one of the other, and means for operatively connecting said universal bars so as to be operable one by the other.

5. In a typewriting machine, the combination of a plurality of key controlled type actions each comprising a key lever and a sub-lever; a carriage; and variable escapement mechanism therefor comprising two universal bars each actuated by certain only of said sub-levers and one operable independently of the other, and means for effecting an operative connection between said universal bars so that the movement of one is effective to move the other.

6. In a typewriting machine, the combination of a plurality of type actions; a carriage; and variable escapement mechanism therefor comprising a dog carrier, a loose dog carried thereby, a controlling device for controlling the extent of movement of said loose dog, means controlled by all of said type actions for moving said dog carrier, two universal bars operable one independently of the other and each operable by certain only of said type actions, operative connections from one of said universal bars to said controlling device, and means operable at will for rendering one of said universal bars operative to actuate the other.

7. In a typewriting machine, the combination of a carriage; and variable escapement mechanism therefor comprising two universal bars, one operable independently of the other, shifting means independent of its operating means for moving one of said universal bars relatively to the other and for rendering one of said universal bars operable by the other.

8. In a typewriting machine, the combination of key controlled printing instrumentalities; case shift mechanism; a carriage; and variable escapement mechanism therefor comprising two universal bars each controlled by certain only of the printing keys and operable independently one of the other, and means controlled by said case shifting mechanism for operatively connecting said universal bars so as to be operable one by the other.

9. In a typewriting machine, the combination of a plurality of key controlled type actions each comprising a key lever and a sub-lever; a carriage; and variable escapement mechanism therefor comprising a primary universal bar actuated by all of said key levers, two auxiliary universal bars each actuated by certain only of said sub-levers and one operable independently of the other, and means for effecting an operative connection between said auxiliary universal bars so that one is rendered effective to move the other.

10. In a typewriting machine, the combination of a plurality of type actions; case shift mechanism; a carriage; and variable escapement mechanism therefor comprising a dog carrier, a loose dog carried thereby, a controlling device for controlling the extent of movement of said loose dog, means controlled by all of said type actions for moving said dog carrier, two universal bars operable one independently of the other and each operable by certain only of said type actions, operative connections from one of said universal bars to said controlling device, and means controlled by said case shift mechanism for rendering one of said universal bars operative to actuate the other.

11. In a typewriting machine, the combination of printing instrumentalities; a platen; case shift mechanism for effecting a relative shifting movement between the printing instrumentalities and the platen; and variable escapement mechanism comprising two universal bars one operable independently of the other, and means controlled by said case shift mechanism for shifting one of said universal bars into cooperative relation with the other so that one universal bar is effective to actuate the other.

12. In a typewriting machine, the combination of key controlled printing instrumentalities; a carriage; and variable escapement mechanism therefor comprising three universal bars one operable by the same printing keys as the others, each of the other universal bars being operable by certain only of the printing keys, and means by which one of the two last mentioned universal bars may be enabled to move independently of the other or the two may be moved in unison.

13. In a typewriting machine, the combination of a plurality of key controlled type actions each comprising a key lever and a sub-lever; a ribbon vibrator; a carriage; and variable escapement mechanism therefor comprising a primary universal bar actuated by all of said key levers and controlling said ribbon vibrator, two auxiliary universal bars each actuated by certain only of said sub-levers and one operable independently of the other, and means for effecting an operative connection between said auxiliary universal bars so that one is rendered effective to move the other.

14. In a typewriting machine, the combination of a plurality of type actions; a ribbon vibrator; a carriage; and variable escapement mechanism therefor comprising a dog carrier, a loose dog carried thereby, a controlling device for controlling the extent of movement of said loose dog, a primary universal bar controlled by all of said type actions and connected to move said dog carrier and to actuate the ribbon vibrator, two auxiliary universal bars operable one independently of the other and each operable by certain only of said type actions, operative connections from one of said auxiliary universal bars to said controlling device, and means operable at will for rendering one of said auxiliary universal bars operative to actuate the other.

15. In a typewriting machine, the combination of a carriage; and variable escapement mechanism therefor comprising two universal bars, one operable independently of the other, one of said universal bars having an operating movement and an independent bodily shifting movement toward and away from the other universal bar, and key controlled means for effecting a bodily movement of said shiftable universal bar to bring it into cooperative relation with the other bar and render one bar operative by the other.

16. In a typewriting machine, the combination of key controlled printing instrumentalities; a carriage; and variable escapement mechanism therefor comprising three universal bars one operable by the same printing keys as the others, each of the other universal bars being operable by certain only of the printing keys, and means by which one of the two last mentioned universal bars may be enabled to move independently of the other or one may be operatively connected to the other to be moved thereby.

17. In a typewriting machine, the combination of a plurality of key controlled type actions each comprising a key lever and a sub-lever; case shift mechanism; a carriage; and variable escapement mechanism therefor comprising two universal bars each actuated by certain only of said sub-levers and one operable independently of the other, and means controlled by said case shift mechanism for effecting an operative connection between said universal bars so that the movement of one is effective to move the other.

18. In a typewriting machine, the combination of a plurality of type actions each comprising a key lever and a sub-lever; a carriage; and variable escapement mechanism therefor comprising a dog carrier, a loose dog carried thereby, a controlling device for controlling the extent of movement of said loose dog, a universal bar operated by all of said key levers and connected to move said dog carrier, two auxiliary universal bars each operable by certain only of said sub-levers and operable independently one of the other, operative connections from one of said auxiliary universal bars to said controlling device, and means for rendering one of said auxiliary universal bars operative to actuate the other.

19. In a typewriting machine, the combination of key controlled printing instrumentalities; case shift mechanism; a carriage; and variable escapement mechanism therefor comprising three universal bars one operable by the same printing keys as the others, each of the other universal bars being operable by certain only of the printing keys, and means controlled by the case shift mechanism and by which one of the two last mentioned universal bars may be enabled to move independently of the other or the two may be moved in unison.

20. In a typewriting machine, the combination of a plurality of key controlled type actions each comprising a key lever and a sub-lever; case shift mechanism; a carriage; and variable escapement mechanism therefor comprising a primary universal bar actuated by all of said key levers, two auxiliary universal bars each actuated by certain only of said sub-levers and one operable independently of the other, and means controlled by said case shift mechanism for effecting an operative connection between said auxiliary universal bars so that one is rendered effective to move the other.

21. In a typewriting machine, the combination of a plurality of type actions each comprising a key lever and a sub-lever; case shift mechanism; a ribbon vibrator; a carriage; and variable escapement mechanism therefor, comprising a dog carrier, a loose dog carried thereby, a controlling device for controlling the extent of movement of said loose dog, a universal bar operated by all of said key levers and connected to move said dog carrier and ribbon vibrator, two auxiliary universal bars each operable by certain only of said sub-levers and operable independently one of the other, operative connections from one of said auxiliary universal bars to said controlling device, and means controlled by the case shift mechanism for rendering one of said auxiliary universal bars operative to actuate the other.

22. In a typewriting machine, the combination of a plurality of key controlled type actions, a universal bar controlled by all of said type actions, a ribbon vibrator controlled by said universal bar, a carriage, variable escapement mechanism under control of said universal bar, a second universal bar operable by certain only of said type actions and also controlling said variable escapement mechanism, a third universal bar controlled by certain only of said type actions which differ from those which control the second universal bar, and means by which said second and third universal bars may be enabled to move independently one of the other or may be made to move in unison.

23. In a typewriting machine, the combination of a plurality of key controlled type actions each comprising a key lever and an upright sub-lever; case shift mechanism; and variable escapement mechanism therefor comprising two universal bars each actuated by certain only of said upright sub-levers and one operable independently of the other, and means for connecting one of said universal bars to shift with the shifted member when the case shift mechanism is operated and thereby bring about an operative connection or disconnection between said universal bars so that one may be operated by the other in one case position of the parts.

24. In a typewriting machine, the combination of printing instrumentalities; a platen; case shift mechanism for effecting a relative shifting movement between the printing instrumentalities and the platen; and variable escapement mechanism comprising two universal bars one operable independently of the other, one of said universal bars having an operating movement and an independent shifting movement toward and away from the other universal bar, and means controlled by said case shift mechanism for effecting a shifting movement of said shiftable universal bar to bring it into coöperative relation with the other bar and render one bar operative by the other.

25. In a typewriting machine, the combination of a plurality of key controlled type actions, a universal bar controlled by all of said type actions, a ribbon vibrator controlled by said universal bar, a carriage, variable escapement mechanism under control of said universal bar, a second universal bar operable by certain only of said type actions and also controlling said variable escapement mechanism, a third universal bar controlled by certain only of said type actions which differ from those which control the second universal bar, and automatically operating means by which said second and third universal bars may be enabled to move independently one of the other at printing operations or may be operatively connected to be moved one by the other.

26. In a typewriting machine, the combination of a plurality of key controlled type actions each comprising a key lever and a sub-lever; case shift mechanism; and variable escapement mechanism therefor comprising a primary universal bar actuated by all of said key levers, two auxiliary universal bars each actuated by certain only of said sub-levers and one operable independently of the other, and means for connecting one of said auxiliary universal bars to shift with the shifted member when the case shift mechanism is operated and thereby bring about an operative connection or disconnection between said auxiliary universal bars so that one may be operated by the other in one case position of the parts.

27. In a typewriting machine, the combination of a plurality of key controlled type actions, case shift mechanism, a universal bar controlled by all of said type actions, a ribbon vibrator controlled by said universal bar, a carriage, variable escapement mechanism under control of said universal bar, a second universal bar operable by certain only of said type actions and also controlling said variable escapement mechanism, a third universal bar controlled by certain only of said type actions which differ from those which control the second universal bar, and means controlled by said case shift mechanism and by which said second and third universal bars may be enabled to move independently one of the other or may be operatively connected to be moved one by the other.

28. In a typewriting machine, the combination of a carriage; and variable escapement mechanism therefor comprising two universal bars one movable independently of the other, and means whereby the movement of one universal bar is effective to move the other.

29. In a typewriting machine, the combination of a plurality of type actions, a carriage, variable escapement devices, a universal bar operable by all of said type actions and connected with said escapement devices, a ribbon vibrator operated by said universal bar, an auxilary universal bar connected with said escapement devices and operable by certain only of said type actions, a second auxiliary universal bar operative by certain only of said type actions and inoperative on the escapement devices except through said first mentioned auxiliary universal bar, said first mentioned auxiliary universal bar being operable independently of the second auxiliary universal bar, and means operative at will for rendering the second auxiliary universal bar operative to actuate the first mentioned auxiliary universal bar.

30. In a typewriting machine, the combination of a carriage; and variable escapement mechanism therefor comprising two universal bars one movable independently of the other, and means for operatively connecting said universal bars so that the movement of one is effective to move the other.

31. In a typewriting machine, the combination of a plurality of key controlled type actions; a carriage; and variable escapement mechanism therefor comprising two universal bars each operable only by certain of said type actions and one operable independently of the other, one of said universal bars having a shifting movement independent of its operating movement, and means independent of the printing keys for shifting said shiftable universal bar to bring said bars into coöperative relation and render one operative by the other.

32. In a typewriting machine, the combination of a plurality of key controlled type actions; case shift mechanism; a ribbon vibrator; a carriage; and variable escapement mechanism therefor comprising a primary universal bar operable by all of said type actions and controlling said ribbon vibrator, two auxiliary universal bars each operable by certain only of said type actions and one operable independently of the other, one of said auxiliary universal bars having a shifting movement independent of its operating movement, and means controlled by said case shift mechanism for shifting said shiftable universal bar to bring said bars into coöperative relation and render one operative by the other.

33. In a typewriting machine, the combination of printing instrumentalities; case shift mechanism; a carriage; and variable escapement mechanism therefor comprising two universal bars one movable independently of the other, and means whereby the movement of one universal bar is effective to move the other, said means being rendered effective or ineffective by the case shift mechanism.

34. In a typewriting machine, the combination of a plurality of key controlled type actions; a carriage; and variable escapement mechanism therefor comprising a primary universal bar operative by all of said type actions, two auxiliary universal bars each operable by certain only of said type actions and one operable independently of the other, one of said auxiliary universal bars having a shifting movement independent of its operating movement, and means independent of the printing keys for shifting said shiftable universal bar to bring said bars into coöperative relation and render one operative by the other.

35. In a typewriting machine, the combination of a carriage; and a variable escapement mechanism therefor comprising escapement devices, a universal bar connected therewith, a second universal bar inoperative on the escapement devices except through said first mentioned universal bar, the first mentioned universal bar being operable independently of the second, and means for rendering the second universal bar operative to actuate the first mentioned bar.

36. In a typewriting machine, the combination of a plurality of key controlled type actions; a ribbon vibrator; a carriage; and variable escapement mechanism therefor comprising a primary universal bar operative by all of said type actions and controlling said ribbon vibrator, two auxiliary universal bars each operable by certain only of said type actions and one operable independently of the other, one of said auxiliary universal bars having a shifting movement independent of its operating movement and normally ineffective on the escapement mechanism, and means independent of the printing keys for shifting said shiftable universal bar to bring said bars into coöperative relation and render one operative by the other.

37. In a typewriting machine, the combination of a plurality of type actions, a carriage, variable escapement devices, a universal bar operable by all of said type actions and connected with said escapement devices, an auxiliary universal bar connected with said escapement devices and operable by certain only of said type actions, a second auxiliary universal bar operative by certain only of said type actions and inoperative on the escapement devices except through said first mentioned auxiliary universal bar, and means operative at will for rendering the second auxiliary universal bar operative to actuate the first mentioned auxiliary universal bar.

38. In a typewriting machine, the combination of printing instrumentalities; case shift mechanism; a carriage; and a variable escapement mechanism therefor comprising escapement devices, a universal bar connected therewith, a second universal bar inoperative on said escapement devices except through said first mentioned universal bar, the first mentioned universal bar being operable independently of the second, and means controlled by the case shift mechanism for rendering the second universal bar operative to actuate the first mentioned bar.

39. In a typewriting machine, the combination of a plurality of key controlled type actions; case shift mechanism; a carriage; and variable escapement mechanism therefor comprising two universal bars each operable only by certain of said type actions and one operable independently of the other, one of said universal bars having a shifting movement independent of its operating movement, and means controlled by said case shift mechanism for shifting said shiftable universal bar to bring said bars into coöperative relation and render one operative by the other.

Signed at the borough of Manhattan, city of New York, in the county of New York, and State of New York this 3rd day of August, A. D. 1917.

JOHN H. BARR.
ARTHUR W. SMITH.

Witnesses:
CHARLES E. SMITH,
E. M. WELLS.